United States Patent [19]
Katko

[11] Patent Number: 5,991,310
[45] Date of Patent: *Nov. 23, 1999

[54] METHOD AND APPARATUS FOR BYPASSING A LOCAL EXCHANGE CARRIER TO PERMIT AN INDEPENDENT CENTRAL OFFICE TO PROVIDE LOCAL CALLING SERVICES

[75] Inventor: Mark G. Katko, Toledo, Ohio

[73] Assignee: Dynamic Telecom Enginering, L.L.C., Cleveland, Ohio

[ * ] Notice: This patent is subject to a terminal disclaimer.

[21] Appl. No.: 08/890,589

[22] Filed: Jul. 9, 1997

Related U.S. Application Data

[63] Continuation-in-part of application No. 08/806,471, Feb. 26, 1997.

[51] Int. Cl.⁶ ............................................. H04M 7/00
[52] U.S. Cl. .................................. 370/522; 379/201
[58] Field of Search ............................. 370/384, 360, 370/357, 522, 523, 524, 420, 466, 537, 539, 540, 527, 359, 220; 379/93.01, 201

[56] References Cited

U.S. PATENT DOCUMENTS

| | | | |
|---|---|---|---|
| 4,685,101 | 8/1987 | Segal et al. | 370/539 |
| 4,731,823 | 3/1988 | Warner et al. | 379/220 |
| 4,791,663 | 12/1988 | Rockne et al. | 379/113 |
| 4,802,199 | 1/1989 | Lange et al. | 379/221 |
| 4,897,870 | 1/1990 | Golden | 379/144 |
| 4,924,500 | 5/1990 | Lewis et al. | 379/201 |
| 4,982,421 | 1/1991 | Kirsch et al. | 379/216 |
| 5,001,711 | 3/1991 | Obana et al. | 370/539 |
| 5,023,904 | 6/1991 | Kaplan et al. | 379/91 |
| 5,130,982 | 7/1992 | Ash et al. | 370/85.7 |
| 5,138,657 | 8/1992 | Colton et al. | 379/220 |
| 5,181,238 | 1/1993 | Medamana et al. | 379/95 |
| 5,193,087 | 3/1993 | Lichtash et al. | 370/58.2 |
| 5,214,692 | 5/1993 | Chack et al. | 379/265 |
| 5,276,444 | 1/1994 | McNair | 340/825.33 |
| 5,293,376 | 3/1994 | White | 370/54 |

(List continued on next page.)

OTHER PUBLICATIONS

Abstract entitled "2FXO Module ISU Module or Plug–On," AdTran, Huntsville, Alabama, undated.
Abstract entitled "E&M/TO Module TSU/HSU Module or Plug–On," AdTran, Huntsville, Alabam, undated.
Abstract entitled "3630 MainStreet", 1993.
Abstract entitled "Ameritech Reconfiguration Service," Ameritech Data Solutions, undated.

*Primary Examiner*—Chau Nguyen
*Attorney, Agent, or Firm*—Woodcock Washburn Kurtz Mackiewicz & Norris LLP

[57] ABSTRACT

A technique for bypassing a local exchange carrier ("LEC") so as to reduce or eliminate the access charges typically payable by an interexchange carrier ("IXC") to a LEC, and, in turn, payable by the subscriber to the IXC, for originating long distance calls. A hardwire connection is provided between the IXC and/or a Central Office operated independent of the LEC and the customer premises by purchasing analog facilities from the LEC which originate at the Central Office and connecting these facilities directly to a multiplexer. The terminating end of the analog facilities are installed at the subscriber premises. The voice interface modules typically used in the multiplexer are replaced by Foreign Exchange Subscriber (FXS) modules which perform A/D conversion of the analog voice data provided over the analog facilities from the customer premises. The terminating end of a T1 or higher capacity digital facility is terminated on the multiplexer and on a K01 digital electronic cross-connect system (DEXCS) frame at the LEC Central Office. A T1 is also ordered from the LEC to connect the DEXCS either directly to the IXC or to the independent Central Office. Each of the channels of the T1 lines are configured by the customer using a network reconfiguration service with FXS Loop Start signaling.

41 Claims, 8 Drawing Sheets

U.S. PATENT DOCUMENTS

| | | | |
|---|---|---|---|
| 5,406,583 | 4/1995 | Dagdeviren | 375/5 |
| 5,425,085 | 6/1995 | Weinberger et al. | 379/112 |
| 5,430,717 | 7/1995 | Fowler et al. | 370/58.2 |
| 5,459,779 | 10/1995 | Backaus et al. | 379/201 |
| 5,463,686 | 10/1995 | Lebourges | 379/220 |
| 5,465,294 | 11/1995 | Chapman, Jr. et al. | 379/207 |
| 5,475,749 | 12/1995 | Akinpelu et al. | 379/221 |
| 5,481,600 | 1/1996 | Alesio | 379/114 |
| 5,481,604 | 1/1996 | Minot | 379/221 |
| 5,510,777 | 4/1996 | Pile et al. | 340/825.31 |
| 5,517,562 | 5/1996 | McConnell | 379/207 |
| 5,524,142 | 6/1996 | Lewis et al. | 379/112 |
| 5,526,413 | 6/1996 | Cheston, III et al. | 379/201 |
| 5,533,111 | 7/1996 | Schlanger | 379/201 |
| 5,537,461 | 7/1996 | Bridges et al. | 379/88 |
| 5,537,464 | 7/1996 | Lewis et al. | 379/114 |
| 5,537,468 | 7/1996 | Hartmann | 379/211 |
| 5,539,817 | 7/1996 | Wilkes | 379/230 |
| 5,550,820 | 8/1996 | Baran | 370/60.1 |
| 5,550,912 | 8/1996 | Akinpelu et al. | 379/221 |
| 5,557,667 | 9/1996 | Bruno et al. | 379/201 |
| 5,566,235 | 10/1996 | Hetz | 379/201 |
| 5,570,410 | 10/1996 | Hooshiari | 379/32 |
| 5,574,783 | 11/1996 | Dunn | 379/230 |
| 5,583,926 | 12/1996 | Venier et al. | 379/207 |
| 5,583,929 | 12/1996 | Ardon | 379/230 |
| 5,751,717 | 5/1998 | Babu et al. | 370/466 |

METHOD AND APPARATUS FOR BYPASSING A LOCAL EXCHANGE CARRIER TO PERMIT AN INDEPENDENT CENTRAL OFFICE TO PROVIDE LOCAL CALLING SERVICES

CROSS-REFERENCE TO RELATED APPLICATIONS

The present application is a continuation-in-part application of U.S. patent application Ser. No. 08/806,471, filed Feb. 26, 1997, the contents of which are hereby incorporated by reference.

BACKGROUND OF THE INVENTION

1. Field of the Invention

The present invention relates generally to a telecommunications system for providing a central office which is independent of the local exchange carriers and, in particular, to a system which bypasses and thus does not require the involvement of a local service provider with respect to vertical and call control features and functions and, which instead, uses existing tariffed data network services to provide the central office functions to a subscriber.

2. Description of the Prior Art

The divestiture of American Telephone & Telegraph (AT&T) in 1984 resulted in the creation of seven Regional Bell Operating Companies ("RBOCs"). AT&T remained as a purely long distance carrier, and the business of providing local telephone services came under the control of these seven RBOCs. Because the seven RBOCs owned all of the expensive infrastructure to provide local telephone services and were not required to freely allow competition for local telephone service in the local markets, to date no company has been successful in entering the estimated $90 billion Local Exchange Carrier ("LEC") market in the United States on a large scale. Therefore, regarding the provision of local telephone services across the United States, the AT&T divestiture in 1984 basically replaced a national monopoly (AT&T) with seven geographic monopolies (RBOCs). The passage of the Telecommunications Act of 1996, the purpose of which was to effect significant competition in the LEC markets, was supposed to change all of this. However, the existing RBOCs, due to their overwhelming size and their ownership of the existing infrastructure, have to date been successful in inhibiting any significant competition in the LEC market since any new entrant into the market has only two options for the provisioning of local telephone services: (1) building new infrastructure which is prohibitively expensive, or (2) successfully negotiating contracts with the incumbent LECs which require the payment of fees to the incumbent LECs in order to utilize their infrastructure to provide local telephone services.

For these reasons, to date no technology has been proposed which would enable a company independent of the RBOCs to provide local telephone services at a cost which is less than current LEC market pricing. There is thus a great need in the art for a system and method which would enable a company independent of the RBOCs to provide cost competitive local telephone services, and hence meaningful competition to the incumbent RBOCs in the LEC market, without requiring a cost prohibitive infrastructure investment. Embodiments of the present invention have been designed to meet these great needs in the art.

As a result of the divestiture of AT&T in 1984, numerous long distance companies have emerged as viable competitors to AT&T in the long distance carrier market. However, most long distance calls must be originated through the LEC infrastructure (i.e., the LEC switch), and all calls are terminated by the LEC switch as well. Therefore, access charges continue to be incurred. Specifically, with respect to outgoing calls placed from a subscriber location, the LEC switch serving the subscriber's customer premises equipment senses an off-hook condition and extends dial tone. When the dialed digits are received in the LEC switch, any features associated with the originating subscriber, such as speed dialing, are applied to the call, and the call is then routed to the desired destination. If the call is a long distance call that is routed to a long distance or interexchange carrier (IXC), then the IXC will pay originating end and terminating end "access charges" to the LEC for servicing the call, and the subscriber will, in turn, pay the IXC for the total cost of the call.

Currently, the access charges paid to LECs by the IXCs for the use of carrier common line service vary by LEC but can, depending on a call's duration and cost per minute, constitute upwards of 40% of the overall cost of the call. Accordingly, eliminating the stranglehold the LECs have on the local market and their claims to the originating end access charges could save a significant percentage of the cost of a long distance call. Bypassing the LEC and the associated originating end access charges could save the IXCs a significant portion of their service costs for providing long distance calls and, once the associated savings are passed on to their subscribers, potentially save their subscribers billions of dollars each year in long distance charges. Payment of such access charges remains a key issue in the telecommunications industry since the passage of the Telecommunications Act of 1996 and is the primary obstacle to enhanced competition between the LECs and other potential entrants into the local telecommunications marketplace. As a result, any long distance service provider who can bypass the LEC and avoid payment of the originating end access charges will be at a substantial competitive advantage. Not unexpectedly, the RBOCs are utilizing every possible means to protect their access charge monopoly, and hence, have currently tied up the implementation of certain provisions of the Telecommunications Act of 1996 in district court litigation.

The inventor is aware of only three prior art techniques by which to complete a long distance call without paying the access charges to the LEC.

The first prior art technique known to the inventor for bypassing the LEC is to provide a separate communications system which provides the subscriber with access to the unregulated long distance telephone carriers through an alternative transmission path besides telephone lines into the subscriber's premises. For example, Baran describes in U.S. Pat. No. 5,550,820 a bi-directional communications system which bypasses the LEC by conveying voice and data over cable television lines from the customer premises to a switching unit that has the functionality of a Class 5 central telephone office switch and is connected to the public switched telephone network. In the system described by Baran, special terminal units are provided at the customer premises, and the signals from the terminal units are converted by a relay transceiver bi-directionally between the signal format of the terminal units and fixed length compliant asynchronous transfer mode ("ATM") cells. These ATM cells are then transmitted via the cable television bandwidth to a cable television hub where the ATM cells are bi-directionally converted by a transmission interface unit into time division multiplexed signals in the upstream direction away from the terminal units for connection to a cellular telephone switch, and from time division multiplexed signals into fixed length compliant ATM cells in the downstream direction towards the terminal units.

While the system described by Baran does indeed bypass the LEC, it still encumbers the subscriber and long distance carrier with many of the same problems as the conventional telephone system. In particular, since the cable television lines are typically owned and operated by a cable television company, access charges are still payable to the cable television company. Also, additional equipment, namely, the terminal units, is required at the customer premises, leading ultimately to additional cost to the subscriber.

The second prior art technique known to the inventor for bypassing the LEC is to create a virtual piped connection over the conventional telephone lines using specialized customer premises equipment at the subscriber location and a specially configured call control platform in the IXC network to originate and receive calls using in-band signaling techniques. Such a technique is described in U.S. Pat. No. 5,533,111, where Schlanger describes a system utilizing a specialized multiplexer to create a virtual piped connection by converting an analog trunk signal into a usable in-band digital carrier. The virtual pipe is established through an initial call made from the specialized customer premises equipment, while in a conventional mode, to the call control platform. Once the virtual pipe is established, the specialized customer premises equipment operates in a bypass mode such that calls made by the subscriber using the specialized customer premises equipment "bypass" the LEC. As long as the virtual pipe exists, the IXC can provide vertical and call control features and functions for incoming and outgoing calls using in-band signaling, while the call control functions typically provided by the customer premises equipment using out-of-band signaling, such as call origination, off-hook, on-hook, and ringing, are provided using in-band signaling. However, conventional out-of-band signaling may still be used to provide conventional LEC features such as call waiting. The virtual pipe to the call control platform may be used for a plurality of calls without being disconnected since the customer premises equipment is prevented from generating a conventional out-of-band mode disconnect signal until breakdown of the virtual pipe is requested by the subscriber. As a result, a subscriber can make one call and pay for one access connection via the LEC and then use that single access connection indefinitely to produce calls across that "virtual" channel.

While the in-band signaling technique described by Schlanger can greatly reduce the amount of access charges paid by the subscriber and long distance carrier, such a technique is disadvantageous in that specialized customer premises equipment is required that must be carried around by the subscriber. Such equipment adds greatly to the cost for the subscriber and is also a very inconvenient way to implement LEC bypass for the subscriber.

The third prior art technique known to the inventor for bypassing the LEC is for the subscriber to lease a T1 line to provide direct switch to switch access to the IXC. However, this approach is prohibitively expensive to all but those companies with very high call volumes sufficient to justify the cost of a T1 line. Leasing a T1 line is quite impractical for companies or individuals with relatively small call volumes where the leasing costs of the T1 line alone would be greater than the amount otherwise paid in originating end access charges.

Accordingly, a LEC bypass technique is desired that does not require specialized customer premises equipment and which is thus more cost competitive. A LEC bypass technique is also desired which extends the benefits of direct T1 access to smaller volume callers without the associated costs of leasing an entire T1 line. Further embodiments of the present invention have been designed to meet these great needs in the art.

SUMMARY OF THE INVENTION

The present invention meets the above-mentioned needs in the art by providing a LEC bypass technology which provides analog voice grade communications from a caller to an independent Central Office (CO) or long distance interexchange carrier ("IXC") by utilizing existing tariffed network data services. Through the bundling of communications services such as dial tone, long distance, Internet access, and security system monitoring, such an independent company will be able, using the techniques of the invention, to offer these services in a bundled platform offering a 20% to 30% savings to the consumer over existing services of these types. As will be explained below, this may be accomplished in accordance with the invention without requiring the subscriber to purchase any new costly hardware. Instead, the LEC bypass is accomplished utilizing existing network technology within the LEC's tariffed equipment which effectively permits a plurality of subscribers to share a T1 (DS-1) line for their Central Office services and long distance calling.

Several embodiments of the invention provide analog voice grade communications from a caller to an independent Central Office (CO) by utilizing existing tariffed network data services. Other embodiments of the invention provide LEC bypass for long distance services. In each case, a hardwire connection is established between either the IXC or the independent CO and the customer premises. This connection allows a subscriber to "bypass" the LEC switching equipment and thus does not require involvement of the local service provider. The hardwire connection is created by purchasing analog data facilities from the LEC which originate at the LEC Central Office. In a preferred embodiment, these facilities are connected directly to a D4 multiplexer at the Central Office or at a site remote from the Central Office and outside of the control of the LEC. The voice interface modules typically used in the D4 multiplexer are then replaced by Foreign Exchange Subscriber (FXS) modules which are typically used to interface a customer's data terminal equipment to T1 or fractional (FT1) services. The terminating end is installed at the subscriber premises and terminated on a standard RJ11X four wire jack. Alternatively, a private cable may connect the remote D4 multiplexer to the subscriber premises. A T1 high capacity digital facility is also ordered from the LEC to terminate to the D4 multiplexer, and the T1 is D4/AMI or ESF/B8ZS configured for 56 or 64 kbps DS0 channels. The terminating end of the T1 is terminated on a K01 digital electronic cross-connect system (DEXCS) frame which is ordered from the LEC as a reconfigurable data service with customer access. Each of the channels of the T1 is then configured by the customer using the reconfiguration service at the end pointing towards the D4 multiplexer with Foreign Exchange Office (FXO) Loop Start signaling. A T1 is also ordered from the LEC to connect the DEXCS to the independent CO and/or the IXC and is also D4/AMI or ESF/B8ZS configured for 56 or 64 kbps DS0 channels. Each of the channels of this T1 is also configured by the customer using the reconfiguration service at the end pointing towards the IXC or independent CO with FXS Loop Start signaling. The IXC terminates the T1 within the IXC network and switches the call and performs all required features associated with the call connection in a conventional manner. Similarly, the independent CO terminates the T1 within the independent CO and provides the conventional Central Office features such as dial tone and call waiting to the subscriber.

In alternative embodiments, a T3 (DS-3) or higher high capacity digital line may connect the D4 multiplexer to the DEXCS frame. In such embodiments, one or more T3:T1 DACCS systems and one or more T3 multiplexers may be used to interface the T1 lines to the T3 lines. Of course, if higher capacity lines were used, higher capacity multiplexers would be required.

In another alternative embodiment, direct analog connections from the customer premises to the DEXCS frame are utilized. In such an embodiment, the DEXCS will accept analog interface cards which are a tariffed service provided by the LEC. The DEXCS is programmed as FXS signaling at the tandem side of the office and FXO to the T1 carrier side. A cross-connect is established to complete the circuit pathway. However, those skilled in the art will appreciate that the cost of such a connection and long-haul analog data lines may be prohibitively expensive.

In preferred embodiments, the independent Central Office comprises telephone switching equipment such as a private branch exchange ("PBX") connected between the second digital data line and a local telephone network. The independent Central Office may also comprise a channel service unit connected to the second digital data line and a DS1 conversion card connected between the telephone switching equipment and the channel service unit. Alternatively, a D4 multiplexer may connect the channel service unit to at least one analog trunk within the telephone switching equipment, where the D4 multiplexer comprises a converter which converts analog voice signals from the analog trunk to digital signals for application to the channel service unit.

The D4 multiplexer connected to the analog data line from the subscriber premises may be located at a location remote from the Central Office of the existing LEC and housed in a weatherproof housing at or near the subscriber's premises. In this case, the analog data line may be a private cable laid between the remote D4 multiplexer and the subscriber's premises.

In another alternative embodiment, the telephone switching equipment of the independent CO may be connected to an interexchange network carrier ("IXC") communications link so as to provide the subscriber with long distance access.

BRIEF DESCRIPTION OF THE DRAWINGS

The objects and advantages of the invention will become more apparent and more readily appreciated from the following detailed description of the presently preferred exemplary embodiments of the invention taken in conjunction with the accompanying drawings of which.

DETAILED DESCRIPTION OF PRESENTLY PREFERRED EMBODIMENTS

A method and apparatus for bypassing a local exchange carrier (LEC) in accordance with the presently preferred exemplary embodiments of the invention will be described below with reference to FIGS. 1–8. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

LONG DISTANCE INTER-EXCHANGE CARRIER ACCESS

Figure 1:
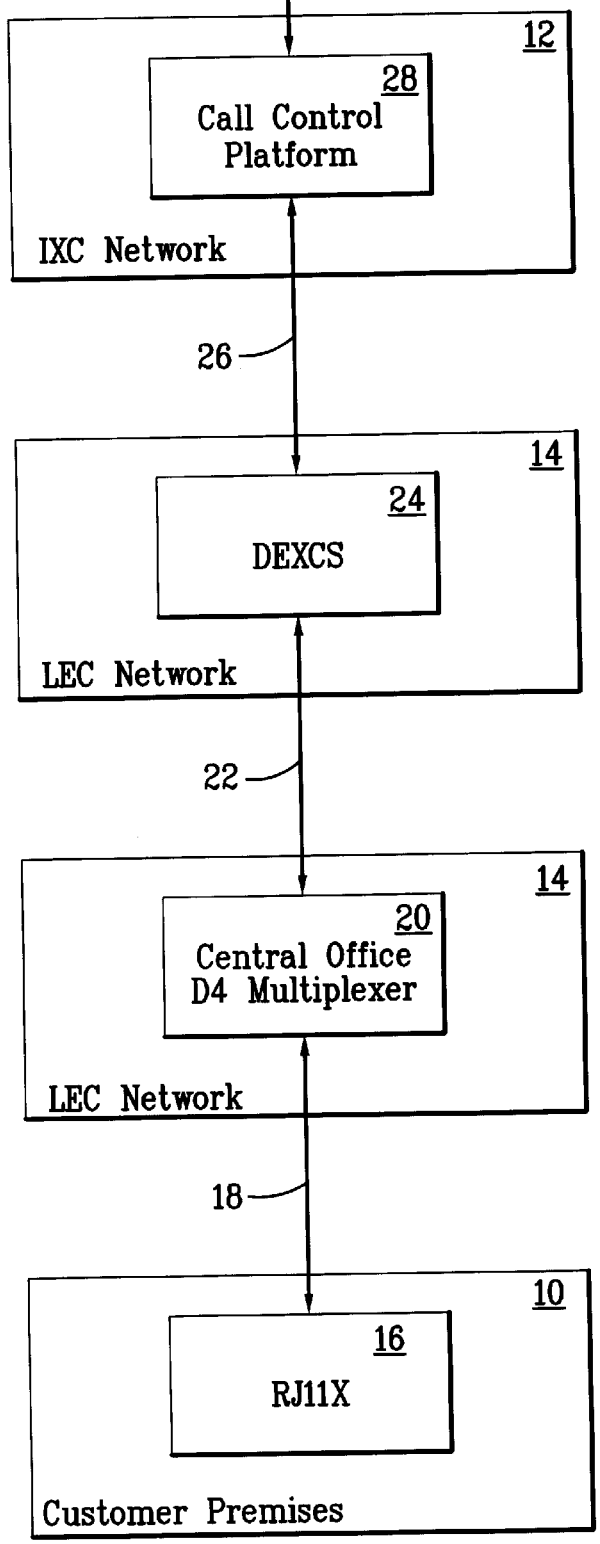
FIG. 1 is an overall block diagram illustrating the hardwire connection between the subscriber premises and the IXC network for bypassing the LEC originating end access charges in accordance with a preferred embodiment of the invention.

The embodiments of FIGS. 1–4 of the present invention relate to a method and apparatus for bypassing LEC equipment tariffed for voice services to provide a customer with direct access, without access charges, to a long distance inter-exchange carrier (IXC). As shown in FIG. 1, such bypass is accomplished in accordance with a preferred embodiment of the invention by creating a hardwire connection between the customer premises 10 and the IXC network 12 via the LEC network 14 using only LEC equipment tariffed for data transmission. As illustrated, the terminating end of the hardwire connection is installed at the customer premises 10 and terminated on a standard RJ11X four wire jack 16. An analog data line 18 is connected directly to the LEC's Central Office D4 multiplexer 20 instead of the conventional DS0 digital data line. As will be explained in more detail below, the voice interface modules typically used in the D4 multiplexer are replaced by Foreign Exchange Subscriber (FXS) modules which are typically used to interface a customer's data terminal equipment to T1 or fractional (FT1) services. Ir accordance with the invention, the FXS modules instead provide A/D and D/A conversion of the voice data provided over the analog data line 18 and also introduce an analog carrier into the D4 multiplexer 20 which is programmed to provide ground start or E & M signaling at the bit level (A=1; B=0) to provide the routing and voice data to the IXC network 12 using techniques known in the art. A T1 high capacity digital line 22 which is D4/AMI or ESF/B8ZS configured for 56 or 64 kbps DS0 channels connects the Central Office D4 multiplexer 20 to a tandem "toll" Central Office and is terminated on a K01 digital electronic cross-connect system (DEXCS) frame 24 which provides software switching of digitized voice data at the channel level. The K01 DEXCS frame 24 is preferably ordered from the LEC as a reconfigurable data service with customer access, and each of the channels of the T1 line 22 is then configured by the customer using the reconfiguration service at the end pointing towards the Central Office D4 multiplexer 20 with Foreign Exchange Office (FXO) Loop Start signaling. A T1 line 26 which is D4/AMI or ESF/B8ZS configured for 56 or 64 kbps DS0 channels connects the DEXCS frame 24 to the IXC network 12, and each of the channels of the T1 line 26 is also configured by the customer using the reconfiguration service at the end pointing towards the IXC with FXS Loop Start signaling. The IXC terminates the T1 line 26 within its own Call Control Platform 28 and switches the call to/from the called party/calling party premises and performs all required features associated with the call connection in a conventional manner.

Unlike the afore-mentioned Schlanger virtual connection which is set up and torn down by the user in order to make long distance calls, the hardwire connection of the invention is permanent and is not torn down. Originating end access charges payable to the LEC are bypassed by using dedicated voice grade quality tariffed D4 data lines where the signaling for the voice channels is carried "in-band" and the analog to digital conversion of the voice channel is performed at the D4 multiplexer using Foreign Exchange Subscriber (FXS) modules. Moreover, by configuring the T1 line 22 for a plurality of DS0 channels, each customer may be assigned a portion of a T1 Line and share the costs of that T1 line service with, for example, up to 23 other customers. The necessary hardware may be purchased from the LEC and configured without LEC assistance. Since the T1 data network tariff is significantly less costly than the network tariff for voice services, savings of up to 55% compared to the costs of conventional LEC access charges are possible using the LEC bypass technique of the invention.

Figure 2:
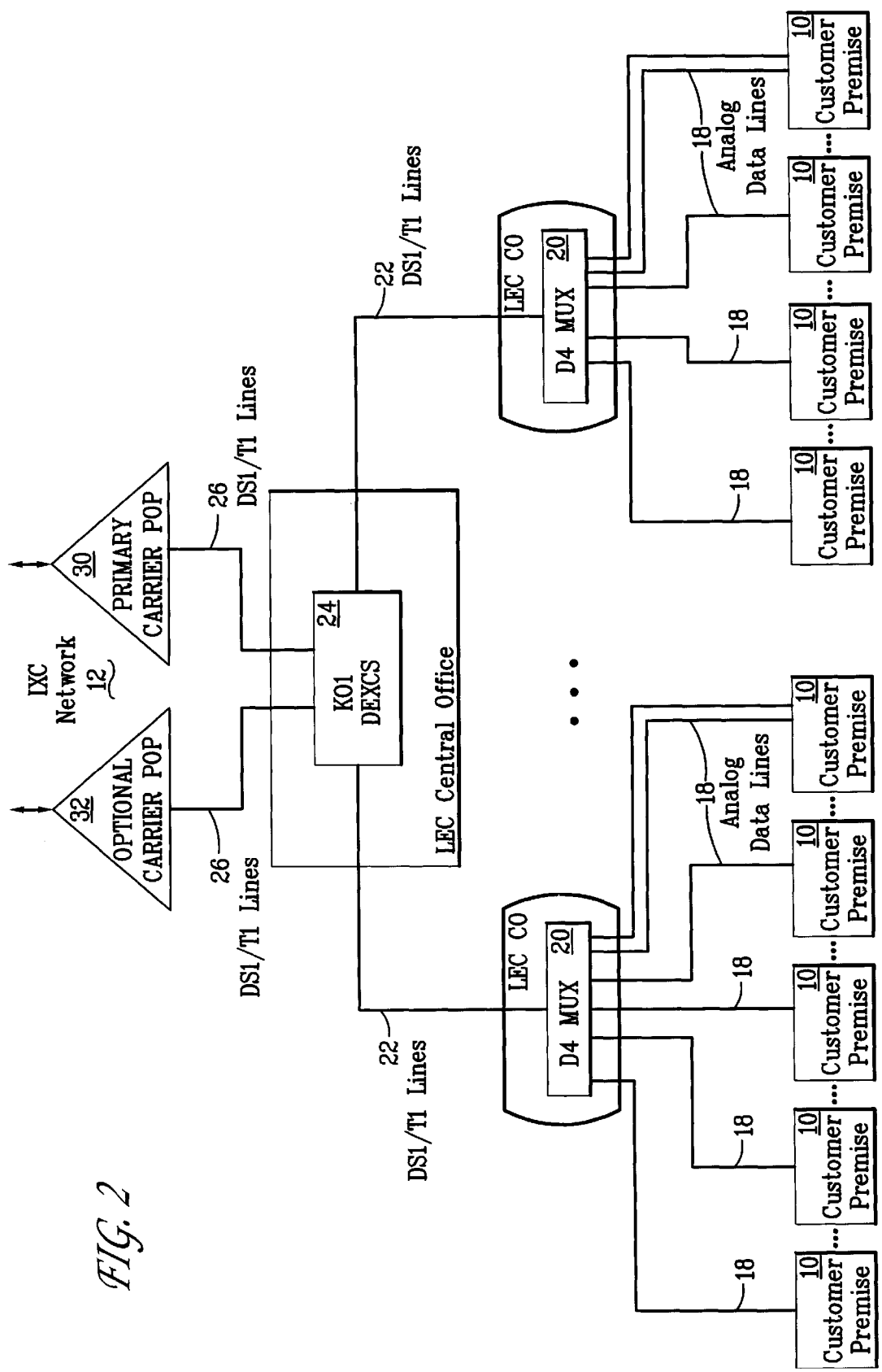
FIG. 2 illustrates in more detail the hardwire connection between the subscriber premises and the IXC network in accordance with a preferred embodiment of the invention.

FIG. 2 illustrates the hardwire connection of FIG. 1 in more detail. As shown, the hardwire connection of the invention is terminated on a standard RJ11X four wire jack 16 at the customer premises 10 and connected via standard analog data (4-wire leased) lines 18 to a D4 multiplexer 20 at the LEC's central office. As shown, each customer may have one or more analog data lines 18 and, as will be explained below, access to one or more DS0 lines in the T1 line 22. In accordance with the invention, the Network Interface (NX) card typically used at the D4 multiplexer 20 for connecting the subscriber's data terminal to the telephone network is replaced by a Foreign Exchange Service (FXS) module, such as the 2FX0 Module available from Adtran. Typically, the FXS module is used to provide local telephone service from a central office which is foreign to the subscriber's exchange area. However, in accordance with the invention, the FXS module is used to terminate an analog PBX and to channelize (i.e., to multiplex-demultiplex wider bandwidth or higher speed channels into narrower bandwidth or lower speed channels) the central office D4 multiplexer DS0 card assignments by introducing FXS ground start or ear and mouth (E&M) analog signaling at the bit level., where bits are toggled so as to effectively modulate the digital carrier wave from the D4 multiplexer 20 with an analog signal containing the call routing information to thereby provide the analog voice signal via in-band signaling. For example, the E band may carry ANI data while the M band may carry the IXC carrier switching data. Framing of the digitized signal to/from the D4 multiplexer 20 is preferably Superframe Audio Messaging Interchange (AMI) line code. Importantly, the FXS module includes A/D conversion circuitry for digitizing the analog voice signal from the subscriber premises 10 and D/A conversion circuitry for converting to analog the network signal to be sent to the customer premises 10. The D4 multiplexer 20 is typically reconfigured by the customer using the network reconfiguration service conventionally available to customers to allow them to control, rearrange and switch the private line voice and analog data. The customer may dial in the appropriate instructions or call a service number and have a LEC attendant do the reconfiguration. Alternatively, in accordance with the invention it is contemplated that a T1 service provider could lease T1 lines from the LEC and lease slots in those T1 lines to a plurality of customers and handle the reconfiguration as part of the leasing service.

The D4 multiplexer 20 provides the modulated digital data to the digital electronic cross-connect system (DEXCS) 24 via T1 lines 22. The data is preferably transmitted over T1 lines 22 using private line interconnect T1 signaling with optional Superframe AMI or extended Superframe binary 8 zero substitution (ESF/B8ZS) channelized into 56 or 64 kbps DS0 data channels by the DEXCS equipment 24.

The DECXS equipment 24 (otherwise known as a Digital Access and Crossconnect System (DACS)) is part of a facilities network for assembling small facility inputs such as a 1.5 megabit DS1 signal into large facility outputs such as for fiber optic transmission, and for disassembling large facility inputs into small facility inputs. The DEXCS equipment 24 is typically located at a tandem central office and switches small facility outputs to destination outputs at the T1 (DS1) channel level for use by the switched public common carrier network and for use by private network customers. The DEXCS equipment 24 is responsive to an operation support system (OSS) which provides the basic information needed by the DEXCS equipment 24 to set up the long term connections within each DEXCS system for carrying information of a plurality of trunks. In accordance with the invention, the OSS provides a network reconfiguration service which allows the subscriber to modify his or her system remotely using a dial-up modem and a personal computer. Desired changes in the cross-connect devices that terminate the T1 digital lines 22 and 26 are communicated to the LEC via the customer's personal computer and are performed within minutes or scheduled to occur at any desired future time. Alternatively, the changes are phoned in to a LEC attendant to perform the desired reconfiguration service.

In accordance with the invention, the DEXCS equipment 24 is reconfigured as follows. First, the DEXCS equipment 24 is ordered as a reconfigurable data service with customer access from the LEC. Each of the channels of the T1 (DS1) is then reconfigured at the end pointing towards the Central Office D4 multiplexer 20 with Foreign Exchange Office (FXO) Loop Start Signaling. The port configurations of the DEXCS equipment 24 are also reconfigured to be FXS toward the far end Central Offices and FXO toward the carrier. Bit signaling is E&M or ground start, and framing is preferably either extended Superframe or Superframe carrier signaling using either AMI or B8ZS. The T1 is channelized into DS0s which are assigned by port signaling Superframe AMI or ESF/B8ZS A&B (A=1; B=0) bits which are toggled FXO per channel. Ground start or E&M signaling at the bit level may also be provided as desired so that the routing information may be stripped off of the digital signal from the D4 multiplexer 20 and the digitized signal routed to the IXC network 12 in a conventional manner. T1 lines 26 are also ordered from the LEC to connect the DEXCS equipment 24 to the IXC network 12 and are also D4/AMI or ESF/B8ZS configured for 56 or 64 kbps DS0 channels. Each of the channels of each T1 line 26 is also configured by the customer using the reconfiguration service at the end pointing towards the IXC network 12 with FXS Loop Start signaling. The IXC network 12 terminates the T1 at a primary long distance carrier point of presence (POP) 30 and at an optional long distance carrier point of presence (POP) 32. As known by those skilled in the art, the POPs 30 and 32 are the points at which the LEC terminates subscriber circuits for long-distance dial-up or leased line communications.

Thus, to establish the hardwire connection in accordance with the invention, the subscriber must order the following services from the LEC:
1. DEXCS service;
2. T1 service originating from the DEXCS to the IXC POP;
3. T1 service originating from the DEXCS to the Tandem Central Office;
4. D4 multiplexing service at the Tandem Central Office with 24 cards in each D4 multiplexer (for 24 customers per T1 line); and
5. Analog data lines originating from the Tandem Central Office D4 multiplexer to the customer premises.

These elements make up the hardwire connection in accordance with the invention. Once these services have been provided by the LEC, the reconfiguration steps described above must be performed to activate the DEXCS equipment 24 using the network reconfiguration service. By way of example, the following reconfiguration steps are performed using the Ameritech Reconfiguration Service:
1. Login to the DEXCS system 24 using dial-up software provided by the LEC.
2. Upon login, select "end link listings" from the menu screen.
3. From the end link listings screen, select "circuit to IXC."
4. Select the first channel in the circuit and press "enter."
5. Scroll down the page to the "Com Type" setting.
6. Simultaneously hit the <Ctrl>+<n> keys to list Com Types.
7. Scroll down the list of Com Types to get the FXO settings.
8. Press <Enter> to complete the change to the Com Type.
9. Exit the end link listings.
10. Move to channel two.
11. Repeat steps 4–10 until all 24 channels are set to FXO.
12. From the "end link listings" screen, now select "circuit to Tandem Central Office."
13. Repeat steps 4–6.
14. Scroll down the list of Com Types to get the FXS setting.
15. Repeat steps 8–11 using the FXS setting.
16. Go to the reservation segment listing menu when all Com Types are complete.
17. From the command line type "reserve" and press <Enter>.
18. Move the cursor to "Point 1" and type in the name of the IXC circuit.
19. Move the cursor to "Point 2" and type in the name of the Tandem Central Office circuit.
20. Select "Contiguous Channel", type in "24" and press <Enter>.

The DEXCS equipment 24 is now programmed to bypass the access charge required by the LEC when using conventional voice lines. Those skilled in the art should note that the above 20 step process is required by the Ameritech Reconfiguration Service but that other LECs may offer slightly different interface software for the same purpose.

Once the DEXCS equipment 24 is reconfigured, the hardwire connection between the customer premises 10 and the IXC network 12 is complete and the LEC bypass system of the invention is ready for use. The hardwire connection of the invention compares to the bypass connection described by Schlanger as follows. The bypass connection in the Schlanger system requires AT&T Central Office trunk lines, AT&T switching hardware, AT&T proprietary customer premises equipment, and an AT&T Virtual Central Office Trunk transport. By contrast, the hardwire connection of the invention uses 4-wire lease lines 18 connected to DEXCS equipment 24 for signaling and D4 multiplexers for D/A and A/D conversion via DS1 (T1) lines configured for data transport. Importantly, no specialized customer premises equipment or virtual central office trunk transport is required. Also, since the subscriber's line is not constantly tied up with a virtual connection, no vertical call control functions and the resulting modifications to the call control platform 28 proposed by Schlanger are needed.

During operation, the customer uses hiE or her telephone equipment to place long distance calls in a conventional manner. No special steps or equipment are necessary. Once the connection is established with the called party, the voice signal is provided by in-band signaling over the T1 line 22 between the DEXCS equipment 24 and the D4 multiplexer 20, which are synchronized to each other. However, at the receiving end, rather than data, voice information is D/A converted and provided to the called party.

In accordance with the invention, each T1 line 22 is preferably shared by up to 24 end user customers at respective customer premises 10. Of course, some customers may use more than one T1 channel as necessary to accommodate their call volume. Accordingly, the cost of the T1 line 22 ordered from the LEC can be distributed among up to 24 customers. Hence, each customer would pay only a fraction of the monthly cost of a tariffed T1 data line 22 instead of paying a large originating access fee per minute of each long distance call. As noted above, this amount is up to 55% less than what the customer would pay in LEC access charges for conventional voice service. The terminating access fee is not affected by the invention and would still be payable to the LEC by the IXC and, in turn, by the customer to the IXC. Of course, the present invention is most cost effective when the customer is a business or an individual who makes many long distance calls.

Figure 3:
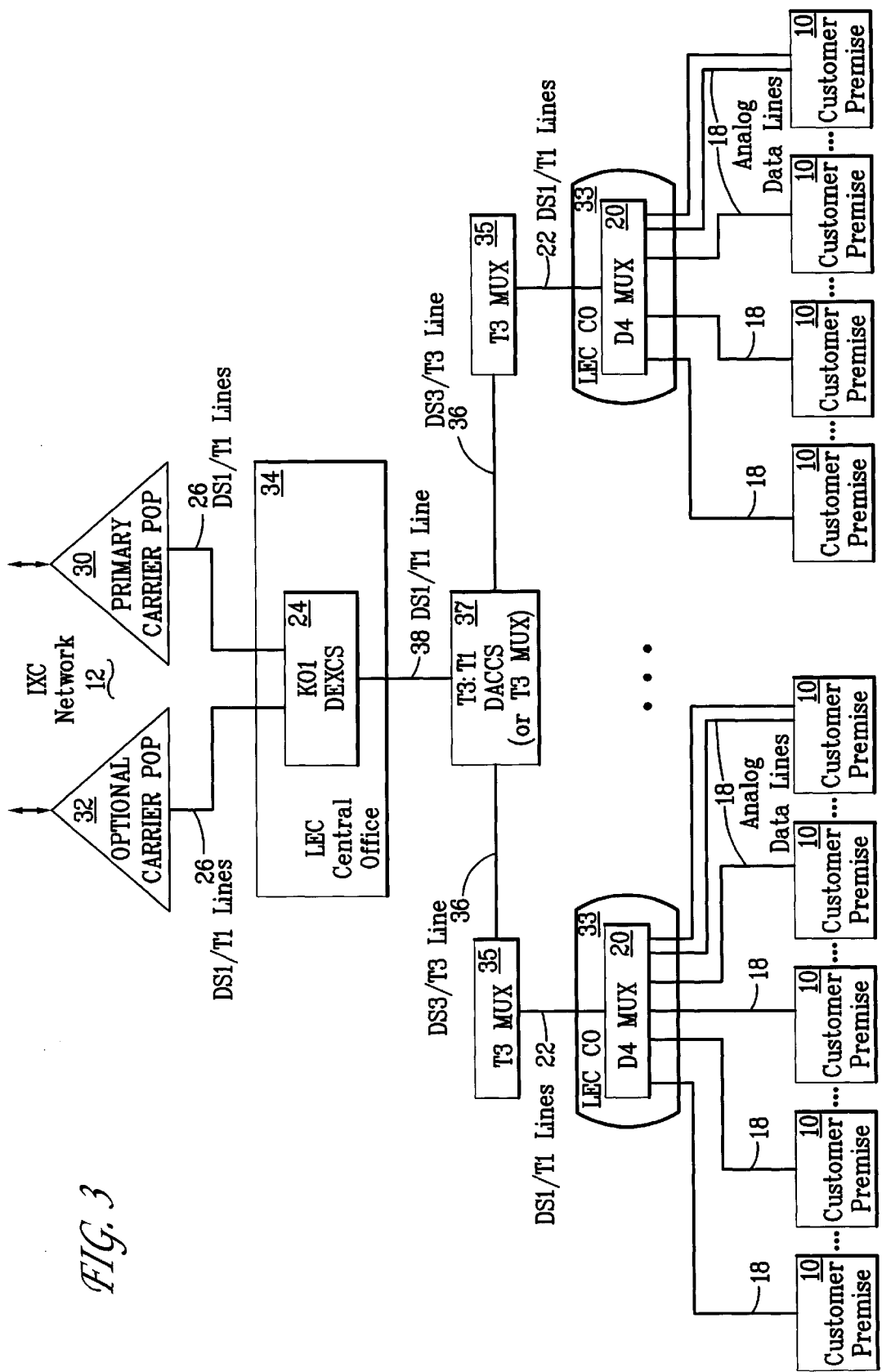
FIG. 3 illustrates the hardwire connection between the subscriber premises and the IXC network in accordance with an alternate embodiment of the invention using T3 lines.

Those skilled in the art will appreciate that any multi-channel digital transmission line at DS-1 or above, such as a T3 line (28 T1 lines) or an optical carrier line (preferably OC3 or OC12), may be used to transmit voice data in accordance with the techniques of the invention. By way of example, FIG. 3 illustrates an alternative embodiment of the invention in which a T3 (DS-3) line connects a LEC Central Office 33 with its tandem Central Office 34. In this embodiment, a T3 multiplexer 35 multiplexes/demultiplexes the T1 lines 22 to the T3 lines 36 and vice-versa. At the tandem Central Office side, another T3 multiplexer or a T3:T1 Digital Access and Cross-Connect System (DACCS) 37 may be used to multiplex/demultiplex the T3 lines 36 to the T1 line 38, and vice-versa. As known to those skilled in the art, the DACCS 37 is similar to a DEXCS frame 24 but connects T3 lines to T1 lines. As illustrated, the other end of the T1 line connects to the K01 DEXCS frame 24 just as in the embodiment of FIG. 2. A similar arrangement to FIG. 3 could be used for optical fiber (OC-3 or OC-12) connections. The embodiment of FIG. 3 is otherwise the same as the embodiment of FIG. 2.

Figure 4:
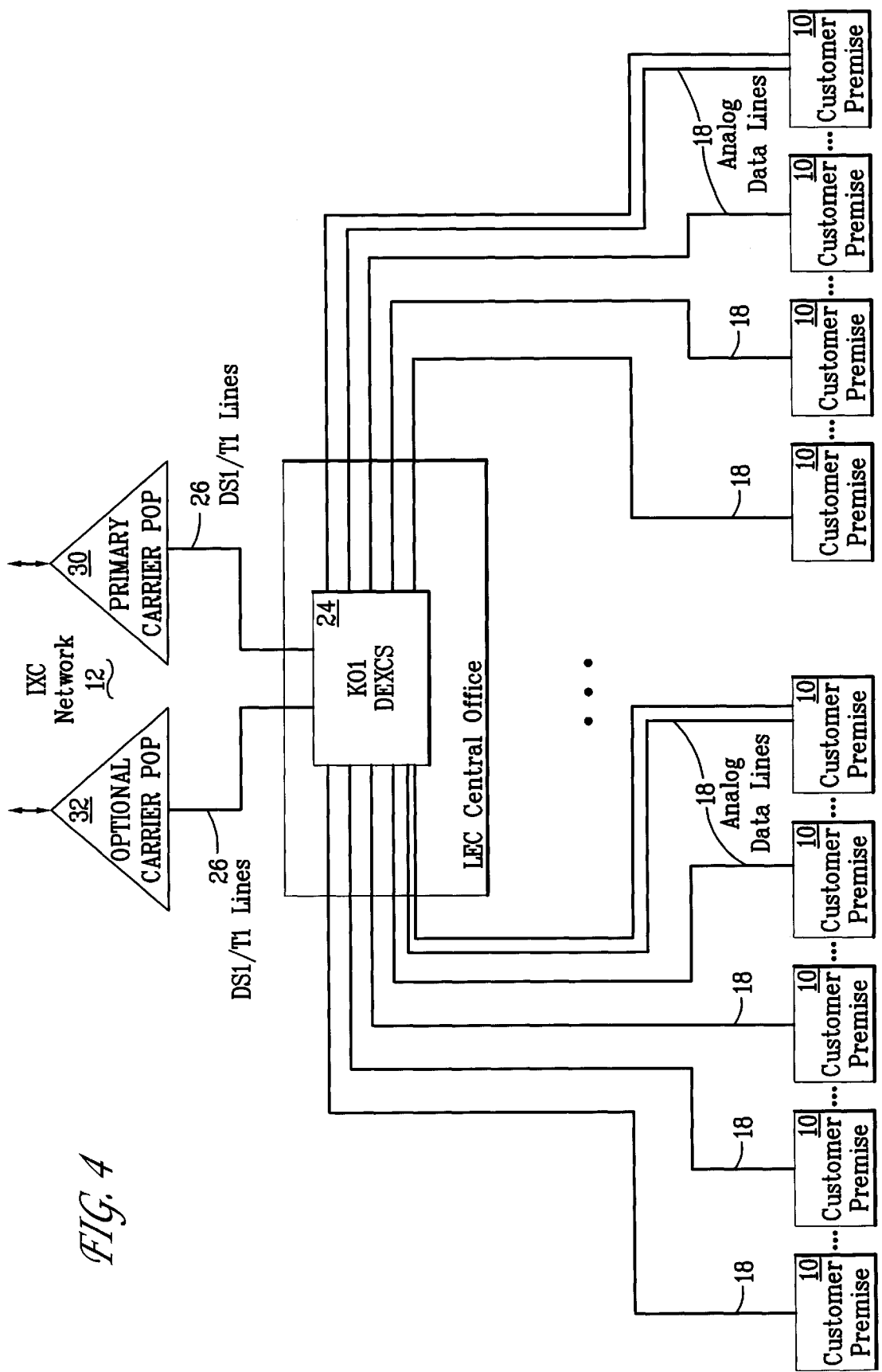
FIG. 4 illustrates the hardwire connection between the subscriber premises and the IXC network in accordance with another alternate embodiment of the invention in which the analog data lines are connected directly to the DEXCS frame.

Those skilled in the art will further appreciate that direct analog connections could be utilized to connect the customer premises equipment 10 directly to the DEXCS frame 24 at the LEC Central Office as illustrated in FIG. 4. Such a LEC bypass approach is available by virtue of the fact that the DEXCS frame 24 will accept analog interface cards which are a tariffed service provided by the LEC at the LEC Central Office. In the embodiment of FIG. 4, the DEXCS frame 24 can be programmed as FXS signaling at the tandem side of the office and FXO to the T1 carrier side. A cross-connect would then be established in a conventional manner in order to complete the circuit pathway. However, those skilled in the art will appreciate that the cost of such an analog connection and long haul analog lines would be prohibitively expensive and are not presently preferred. Since the key element in the marketability of the present invention is the ability to provide bundled transport to lower the bypass costs, the approach of FIG. 4 is not presently cost effective.

INDEPENDENT CENTRAL OFFICE

Figure 5:
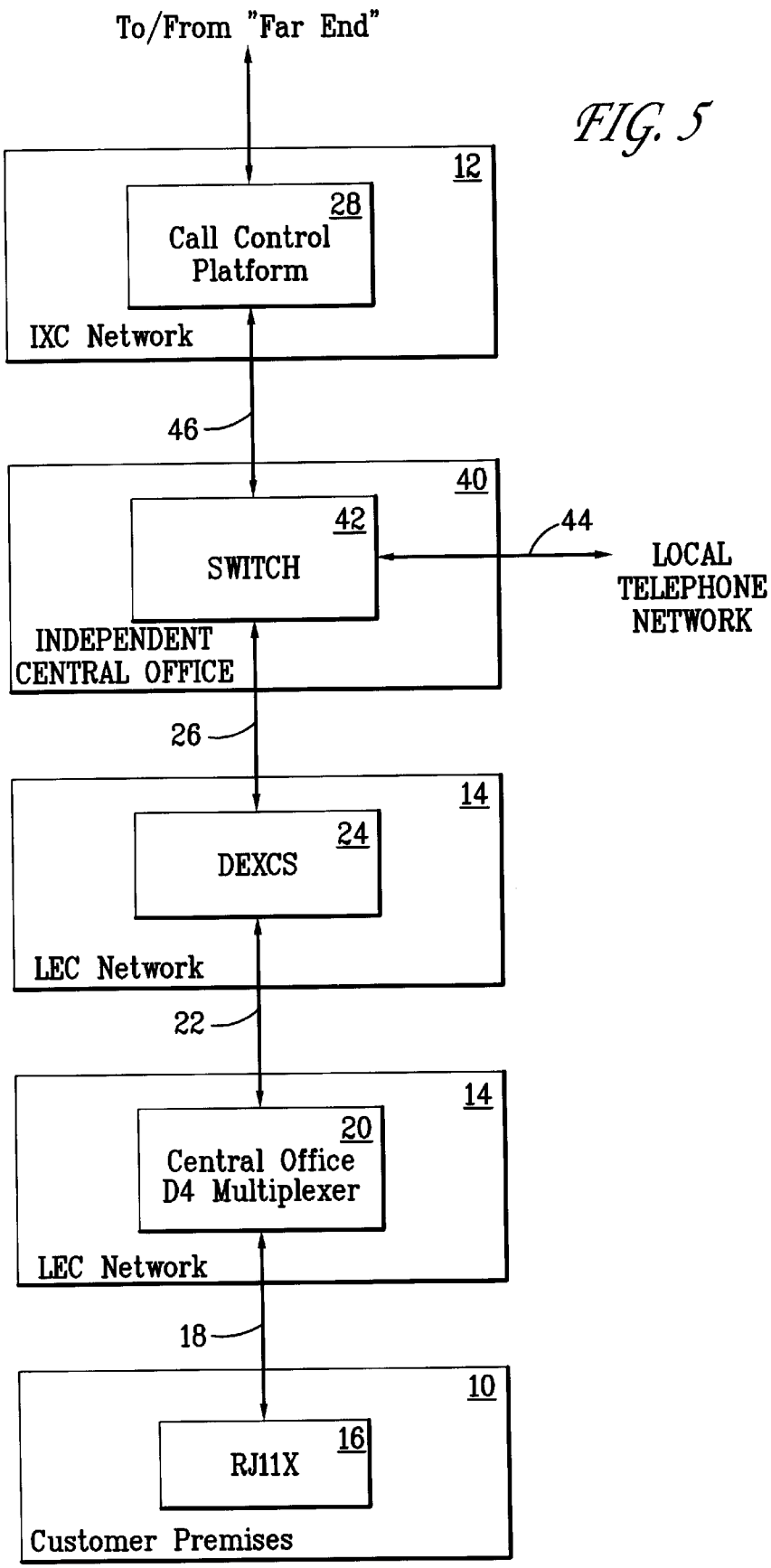
FIG. 5 is an overall block diagram illustrating the hardwire connection between the subscriber premises and an independent Central Office in accordance with a preferred embodiment of the invention.

The embodiments of FIGS. 5–8 of the present invention relate to a method and apparatus for bypassing LEC equipment tariffed for voice services to provide analog voice grade communications from a caller to an independent Central Office (CO) by utilizing existing tariffed network data services. As shown in FIG. 5, such bypass is accomplished in accordance with a preferred embodiment of the invention by creating a hardwire connection between the customer premises 10 and the independent Central Office 40 via the LEC network 14 using only LEC equipment tariffed for data transmission. As in the embodiments of FIG. 1–4, the terminating end of the hardwire connection is installed at the customer premises 10 and terminated on a standard RJ11X four wire jack 16. An analog data line 18 is connected directly to the LEC's Central Office D4 multiplexer 20 instead of the conventional DS0 digital data line. The voice interface modules typically used in the D4 multiplexer are replaced by Foreign Exchange Subscriber (FXS) modules to provide A/D and D/A conversion of the voice data provided over the analog data line 18 and to introduce an analog carrier into the D4 multiplexer 20 which is programmed to provide ground start or E & M signaling at the bit level (A=1; B=0) to provide the routing and voice data to the IXC network 12 using techniques known in the art. A T1 or T3 high capacity digital line 22 which is D4/AMI or ESF/B8ZS configured for 56 or 64 kbps DS0 channels connect the Central Office D4 multiplexer 20 to a tandem "toll" Central Office and is terminated on a K01 digital electronic cross-connect system (DEXCS) frame 24 which provides software switching of digitized voice data at the channel level. As in the embodiments of FIGS. 1–4, the K01 DEXCS frame 24 is preferably ordered from the LEC as a reconfigurable data service with customer access, and each of the channels of the T1 line 22 is then configured by the customer using the reconfiguration service at the end pointing towards the Central Office D4 multiplexer 20 with Foreign Exchange Office (FXO) Loop Start signaling. A T1 or T3 line 26 which is D4/AMI or ESF/B8ZS configured for 56 or 64 kbps DS0 channels connects the DEXCS frame 24 to the independent Central Office 40. A private branch exchange 42 within the independent Central Office 40 then terminates the connection at either the local telephone network connection via the T1 or T3 transmission line 44, or at the IXC network 12 via a T1 or T3 transmission line 46. Each of the channels of the line 26 is also configured by the customer using the reconfiguration service at the end pointing towards the Central Office and IXC with FXS Loop Start signaling. The lines 44 and 46 from the independent Central Office 40 may be conventional T1 or T3 lines and need not be specially configured. As in the above embodiments, the IXC Network 12 terminates the transmission line 46 within its own Call Control Platform 28 and switches the call to/from the called party/calling party premises and performs all required features associated with the call connection in a conventional manner.

Figure 6:
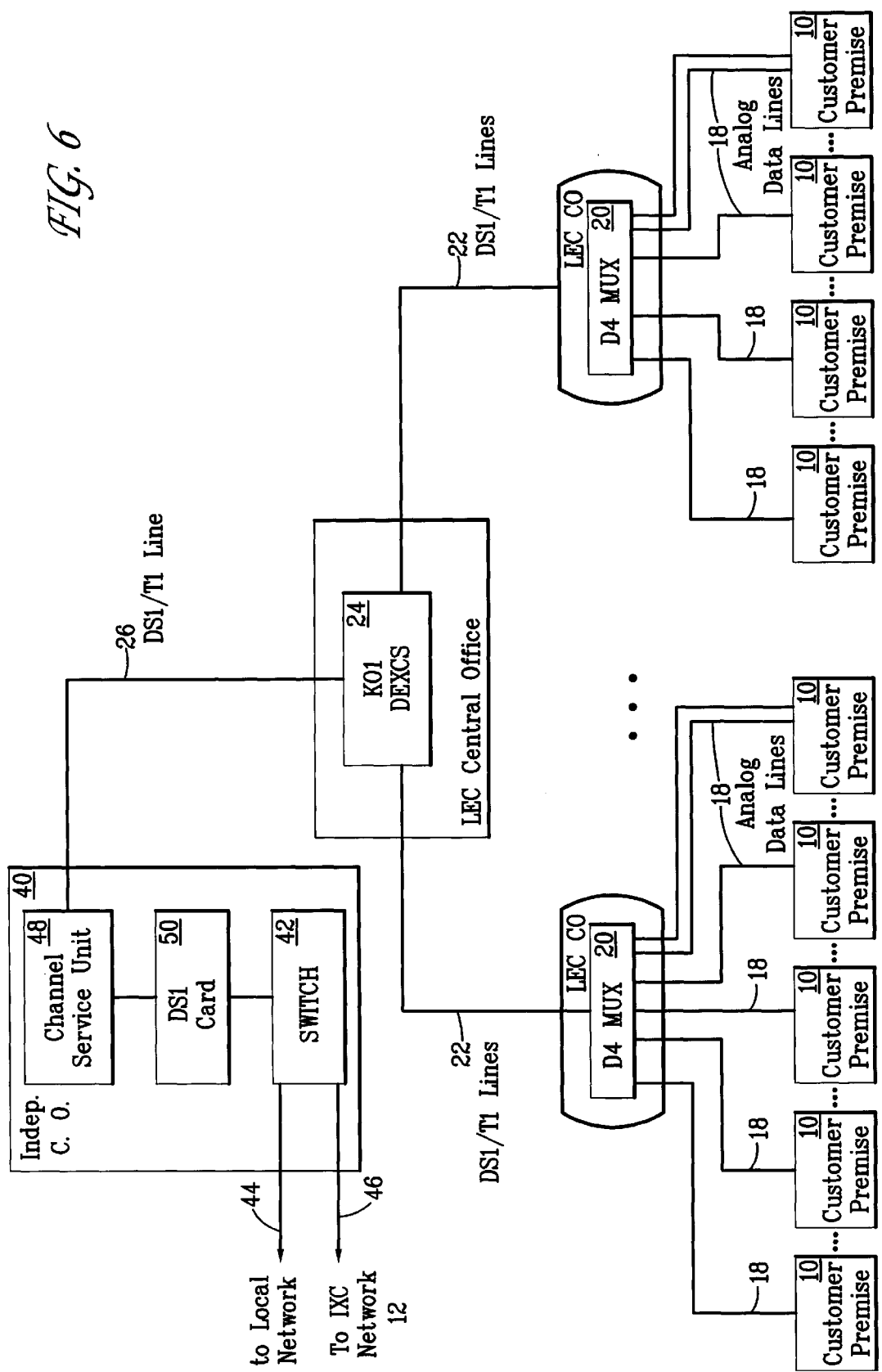
FIG. 6 illustrates in more detail the hardwire connection between the subscriber premises and an independent Central Office in accordance with a preferred embodiment of the invention.

FIG. 6 illustrates the hardwire connection of FIG. 5 in more detail. Since many of the elements are configured and perform in the same manner as described above with respect to FIG. 2, only the elements of the independent Central Office 40 will be described in detail. It will be appreciated by those skilled in the art that the other elements of FIG. 6 function in the same manner as described above with respect to like numbered elements.

In the embodiment of FIG. 6, instead of terminating the lines 26 from the DEXCS 24 at the IXC Network 12, a digital network is provided via a physical medium such as a T1, 2-wire, or 4-wire lines 26 which connect to a standard Channel Service Unit (CSU) 48 of an independent Central Office 40 comprising telephone switching equipment such as a private branch exchange ("PBX") 42 such as a Lucent Technologies Definity G3 PBX system further equipped with a DS1 card 50. The CSU 48 preferably interfaces with a DS1/T1 line 26 and provides the line power and a place for the carrier to loop back the DS1/T1 line 26 for line inspection. CSU 48 also provides the correct physical network termination for the DS1/T1 line 26, as well as isolation and physical line protection. The CSU 48 further provides a combination of two functions defined by the public network carriers: (1) correct T1 framing and (2) synchronous protocol translation. As known to those skilled in the art, the CSU 48 can be found as either a stand-alone unit or incorporated into other equipment (such as multiplexers, Network Interface cards, and routers, such as telephone switching equipment 42).

The DS1 card 50, on the other hand, functions in effectively the same manner as a D4 Multiplexer by breaking down DS1 channels into DS0 channels and allowing the usable bandwidth to interact directly with the telephone switching equipment 42 at the independent Central Office 4C. In particular, DS1 card 50 functions as a Line-Side T1 interface which provides communications to remote locations by providing off-premise extensions to remote locations. Analog telephone functionality is extended over T1 facilities and channel bank units to provide the telephone at the remote site with full access to 2500-type line functionality. In accordance with the invention, the software of the telephone switching equipment 42 is optioned to condition the DS1 channels of the DS1 card 50 as FXO. Thus, the telephone switching equipment 42 could replace the IXC as the terminating point of the local network. Alternatively, as in the embodiments of FIGS. 1–4, the telephone switching equipment 42 may terminate at the IXC network 12.

In this embodiment of the invention, the telephone switching equipment 42 could be used to extend conventional LEC Central Office services, such as Public Dial Tone, Call Waiting, Call Forwarding, Three Way Calling, Caller ID, Internet access, security system monitoring, and the like to the customer premise 10. Also, as noted above, the telephone switching equipment 42 may be a Lucent Technologies Definity G3 PBX system which provides access to long distance service via line 46. In addition, those skilled in the art will appreciate that the T1 lines illustrated in FIGS. 5 and 6 may be replaced by T3 lines or optical carrier lines ((OC3 or OC12) as noted above with respect to the embodiment of FIG. 3.

Figure 7:
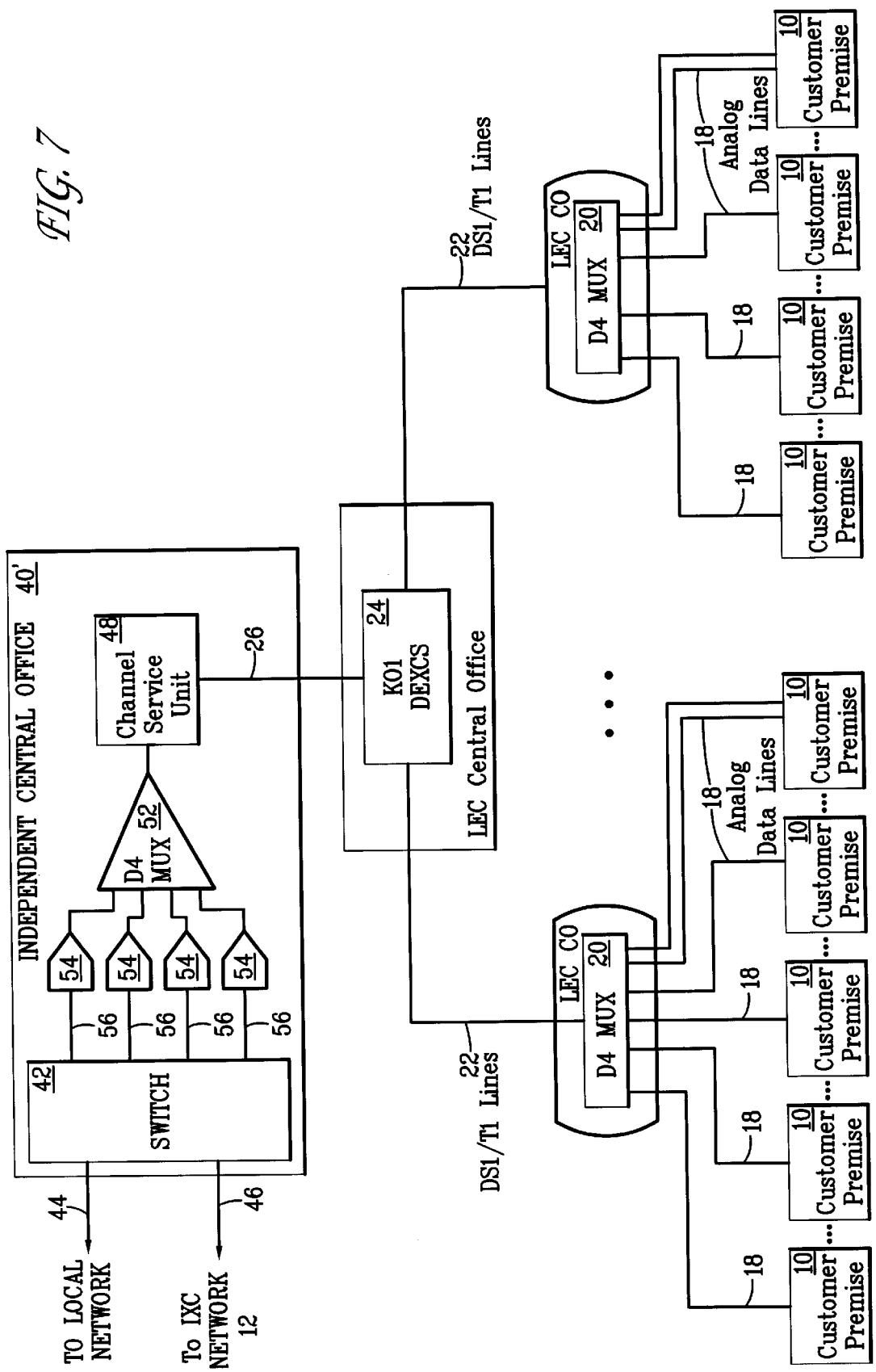
FIG. 7 illustrates the hardwire connection between the independent Central Office and the DEXCS frame in accordance with an alternate embodiment of the invention.

In the alternative embodiment illustrated in FIG. 7, the independent Central Office 40' is reconfigured by replacing the DS1 card 50 with a D4 channel bank 52 which is placed in front of the telephone switching equipment 42 to allow the use of analog trunk cards or OPX analog line cards 54 which connect to the telephone switching equipment 42 via analog trunk lines 56. As known to those skilled in the art, the analog trunk card is a standard card for accepting analog stations, such as is commonly used in PBX-type applications. The OPX analog line card, on the other hand, is another remote service that provides the ability to extend features and services to 2500-type telephones located remotely from the independent Central Office telephone switching equipment 42. The OPX analog line card interfaces with facsimile, key systems, Centrex, and other external telephone equipment requiring a standard analog line interface. It also provides inherent lightning and power cross protection typically required for off-premise locations or campus environments. The OPX analog line card also accepts standard analog 4-wire interfaces and interprets the information directly to the telephone switching equipment 42.

Figure 8:
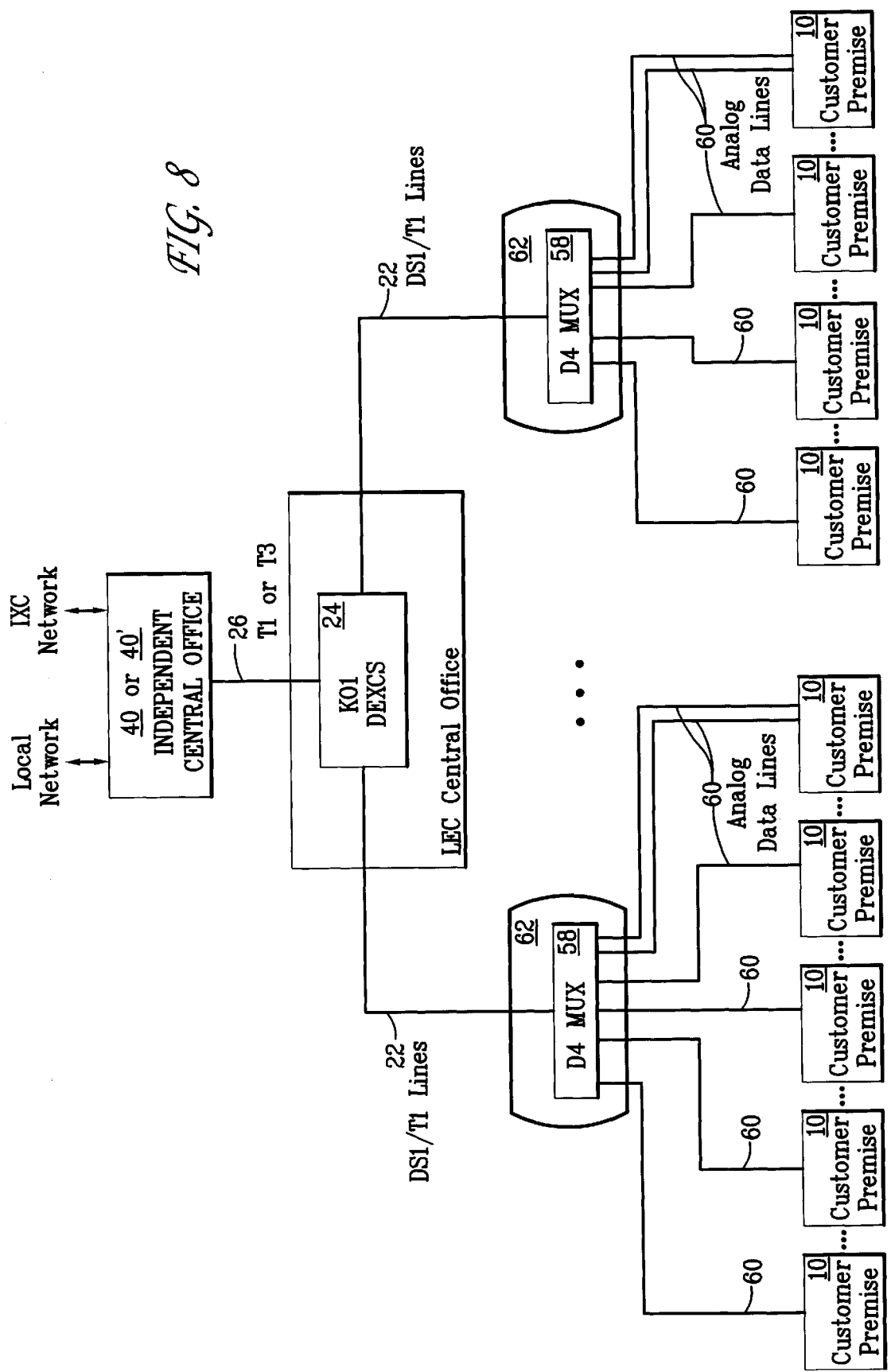
FIG. 8 illustrates the hardwire connection between the independent Central Office and the subscriber premises in accordance with another alternate embodiment of the invention.

In the embodiments of FIGS. 1–3 and 5–7 it was assumed that the D4 multiplexer 20 was provided as part of the Central Office equipment owned and operated by the incumbent LEC. However, in accordance with a fur her embodiment of the invention, the D4 multiplexers 20 and 52 need not be owned and operated by the incumbent LEC. Instead, as illustrated in FIG. 8, the D4 multiplexers 20 of the Central Office may be replaced by privately owned stand alone D4 multiplexers 58 not provided by the LEC 14 as part of the Central Office equipment. In FIG. 8, the lines 60 connecting the customer premise 10 to the D4 multiplexers 58 are private copper wire cable instead of the LEC provided analog data lines 18 described above. In the embodiment of FIG. 8, the privately owned D4 multiplexers 58 may be provided outside in a weatherproof housing 62 with an uninterruptible power source (UPS) so as to provide a simple independent Central Office capability in accordance with the invention which is free of most right of way concerns.

In an illustrative embodiment, the privately owned D4 multiplexers 58 may be placed in new housing developments. Once new copper wire cable 60 is laid from the D4 multiplexers 58 to each new home, Central Office capability may be provided via the remotely located D4 multiplexers 58 in accordance with the embodiment of FIG. 8. In particular, in the embodiment of FIG. 8, when a subscriber requests service from the independent Central Office provider, Central Office capability is provided to that subscriber by buying or leasing one or more T1 lines from the LEC Central Office which lines run through the conventional telephone right-of-ways to the new housing development. As noted above, these T1 lines are terminated at one end to the DEXCS frame 24 at the LEC Central Office 14. The other ends of the T1 lines from the LEC Central Office 14 are terminated on an outside D4 multiplexer 58 provided at the housing development in a weatherproof housing 62. DO analog lines from the D4 multiplexer 58 would be analog lines 60 (copper wires) which would be provided to each subscriber residence 10. The right-of-ways for these analog lines could be provided conveniently by the housing developer during construction independent of the LEC. The subscriber would then receive conventional Central Office bundled services as well as Internet access and security system monitoring at a rate substantially reduced from that currently provided by the LECs.

Although exemplary embodiments of the invention have been described in detail above, those skilled in the art will readily appreciate that many additional modifications are possible in the exemplary embodiment without materially departing from the novel teachings and advantages of the invention. For example, another modulation scheme besides the foreign exchange modulation scheme utilized in the preferred embodiment may be implemented in accordance with the invention. Also, those skilled in the art will appreciate that in each case the T1 data lines described may be T1 or greater high capacity data lines (e.g., T3, OC3, OC12). In addition, those skilled in the art will appreciate that other telephone equipment besides a PBX may be used to provide the switching and Central Office functions at the independent Central Office. Moreover, the switching equipment need not be analog but may be completely digital. Accordingly, these and all such modifications are intended to be included within the scope of this invention as defined in the following claims.

I claim:

1. A communications path for providing Central Office services to a subscriber's telephone equipment, said communications path comprising:

an analog data line connected at one end to said subscriber's telephone equipment so as to receive analog voice signals;

a multiplexer connected to another end of said analog data line, said multiplexer containing a converter which converts an analog voice signal on said analog data line to a digital voice signal;

a first digital data line connected at one end to said multiplexer, said digital data line being configured to carry a plurality of channels of digital voice signals to/from said multiplexer;

a reconfigurable digital electronic cross-connect system ("DEXCS") which is configured to provide signaling over each of said plurality of channels of said first digital data line to/from said multiplexer and which provides switched connections to an output of said DEXCS;

an independent Central Office which is independent of an existing local exchange carrier ("LEC") and provides said Central Office services over a digital data line connected at an output thereof; and a second digital data line connected to said output of said DEXCS and to an input of said independent Central Office.

2. A communications path as in claim 1, wherein said independent Central Office comprises a switch connected between said second digital data line and a local telephone network.

3. A communications path as in claim 2, wherein said independent Central Office further comprises a channel service unit connected to said second digital data line and a DS1 conversion card connected between said switch and said channel service unit.

4. A communications path as in claim 2, wherein said independent Central Office further comprises a channel service unit connected to said second digital data line and a multiplexer connecting said channel service unit to at least one analog trunk card within said switch, said multiplexer comprising a converter which converts analog voice signals from said analog trunk card to digital signals for application to said channel service unit.

5. A communications path as in claim 1, wherein said multiplexer is located at a location remote from a Central Office of said existing LEC and proximate said subscriber's premises.

6. A communications path as in claim 5, further comprising a weatherproof housing for enclosing said multiplexer.

7. A communications path as in claim 5, wherein said analog data line is a private cable laid between said remote multiplexer and the subscriber's premises.

8. A communications path as in claim 2, wherein said switch is further connected to an interexchange network carrier ("IXC") communications link so as to provide said subscriber with long distance access via said communications path.

9. A communications path as in claim 1, wherein said analog data line is a four-wire leased line which is terminated on a four-wire jack at the subscriber's premises.

10. A communications path as in claim 1, wherein said first and second digital data lines comprise T1 lines which are either D4/AMI or ESF/B8ZS configured for a plurality of 56 or 64 kbps DS0 channels.

11. A communications path as in claim 1, wherein said multiplexer is located at a LEC Central Office and said converter comprises at least one Foreign Exchange Service ("FXS") module including an A/D converter which converts said analog voice signal on said analog data line to said digital voice signal and a D/A converter which converts a digital voice signal from said first digital data line to an analog voice signal for transmission to the subscriber's telephone equipment via said analog data line.

12. A communications path as in claim 11, wherein said DEXCS is reconfigurable on behalf of said subscriber to provide Foreign Exchange Office ("FXO") loop start signaling to/from said FXS module.

13. A communications path as in claim 11, wherein said DEXCS is reconfigurable on behalf of said subscriber to provide Foreign Exchange Service ("FXS") loop start signaling to/from said independent Central Office.

14. A communications path as in claim 11, wherein said at least one FXS module modulates call routing data onto said digital voice signals using one of ground start and ear and mouth signaling at the bit level.

15. A communications path for providing Central Office services to a subscriber's telephone equipment, said communications path comprising:
  an analog data line connected at one end to said subscriber's telephone equipment so as to receive analog voice signals;
  conversion means connected to another end of said analog data line for converting an analog voice signal on said analog data line to a digital voice signal;
  a first digital data line connected at one end to said conversion means, said digital data line being configured to carry a plurality of channels of digital voice signals to/from said conversion means;
  reconfigurable digital switching means for providing signaling over each of said plurality of channels of said first digital data line to/from said conversion means and for providing switched connections to an output of said digital switching means;
  an independent Central Office which is independent of an existing local exchange carrier ("LEC") and provides said Central Office services over a digital data line connected at an output thereof; and
  a second digital data line connected to said output of said digital switching means and to an input of said independent Central Office.

16. A communications path as in claim 15, wherein said independent Central Office comprises a switch connected between said second digital data line and a local telephone network.

17. A communications path as in claim 16, wherein said independent Central Office further comprises a channel service unit connected to said second digital data line and D/A and A/D conversion means connected between said switch and said channel service unit.

18. A communications path as in claim 16, wherein said independent Central Office further comprises a channel service unit connected to said second digital data line and a multiplexer connecting said channel service unit to at least one analog trunk within said switch, said multiplexer comprising a converter which converts analog voice signals from said analog trunk to digital signals for application to said channel service unit.

19. A communications path as in claim 15, wherein said conversion means is located at a location remote from a Central Office of said existing LEC and proximate said subscriber's premises.

20. A communications path as in claim 19, further comprising a weatherproof housing for enclosing said conversion means.

21. A communications path as in claim 19, wherein said analog data line is a private cable laid between said remote conversion means and the subscriber's premises.

22. A communications path as in claim 16, wherein said switch is further connected to an interexchange network carrier ("IXC") communications link so as to provide said subscriber with long distance access via said communications path.

23. A communications path as in claim 15, wherein said analog data line is a four-wire leased line which is terminated on a four-wire jack at the subscriber's premises.

24. A communications path as in claim 15, wherein said first and second digital data lines comprise T1 lines which are either D4/AMI or ESF/B8ZS configured for a plurality of 56 or 64 kbps DS0 channels.

25. A communications path as in claim 15, wherein said conversion means is located at a LEC Central Office and comprises at least one Foreign Exchange Service ("FXS") module including an A/D converter which converts said analog voice signal on said analog data line to said digital voice signal and a D/A converter which converts a digital voice signal from said first digital data line to an analog voice signal for transmission to the subscriber's telephone equipment via said analog data line.

26. A communications path as in claim 25, wherein aid digital switching means is reconfigurable on behalf of said subscriber to provide Foreign Exchange Office ("FXO") loop start signaling to/from said FXS module.

27. A communications path as in claim 25, wherein said digital switching means is reconfigurable on behalf of said subscriber to provide Foreign Exchange Service ("FXS") loop start signaling to/from said independent Central Office.

28. A communications path as in claim 25, wherein said at least one FXS module modulates call routing data onto said digital voice signals using one of ground start and ear and mouth signaling at the bit level.

29. A method of providing Central Office services to a subscriber's telephone equipment, said method comprising the steps of:
  connecting one end of an analog data line to said subscriber's telephone equipment so as to receive analog voice signals;
  providing access to conversion means for converting an analog voice signal on said analog data line to a digital voice signal;
  configuring a first digital data line connected at one end to said conversion means so as to carry a plurality of channels of digital voice signals to/from said conversion means;

configuring digital switching means tariffed for data services so as to provide signaling over each of said plurality of channels of said digital dati line to/from said conversion means and so as to provide switched connections to respective outputs of said digital switching means; and configuring a second digital data line connected at one end to an output of said digital switching means so as to carry switched digital voice signals to/from an independent Central Office which is independent of an incumbent Local Exchange Carrier ("LEC") Central Office.

30. A method as in claim 29, comprising the further step of connecting said independent Central Office to a local telephone network via a switch connected between said second digital data line and said local telephone network.

31. A method as in claim 30, comprising the further step of A/D converting data passing from said switch to said second digital data line and of D/A converting data passing from said second digital data line to said switch.

32. A method as in claim 29, comprising the further step of locating said conversion means at a location remote said incumbent LEC Central Office and proximate said subscriber's premises.

33. A method as in claim 32, comprising the further step of placing said conversion means outdoors in a weatherproof housing which encloses said conversion means.

34. A method as in claim 30, comprising the further step of connecting said switch to an interexchange network carrier ("IXC") communications link so as to provide said subscriber with long distance access via said digital switching means.

35. A method as in claim 29, wherein said analog data line is a four-wire leased line and said connecting step comprises the step of terminating said four-wire leased line on a four-wire jack at the subscriber's premises.

36. A method as in claim 29, wherein said steps of configuring said first and second digital data lines each comprise the step of either D4/AMI or ESF/B8ZS configuring T1 lines for a plurality of 56 or 64 kbps DS0 channels.

37. A method as in claim 29, comprising the additional step of configuring a multiplexer so as to include at least one Foreign Exchange Service ("FXS") module including an A/D converter which converts said analog voice signal on siid analog data line to said digital voice signal and a D/A converter which converts a digital voice signal from said first digital data line to an analog voice signal for transmission to the subscriber's telephone equipment via said analog data line.

38. A method as in claim 37, wherein said digital switching means configuring step comprises the step of providing Foreign Exchange Office ("FXO") loop start signaling to/from said FXS module.

39. A method as in claim 37, wherein said digital switching means configuring step comprises the step of providing Foreign Exchange Service ("FXS") loop start signaling to/from said independent Central Office.

40. A method as in claim 37, comprising the additional step of modulating call routing data onto said digital voice signal at said FXS module using ore of ground start and ear and mouth signaling at the bit level.

41. A method of providing Central Office services to a subscriber's telephone equipment, said method comprising the steps of:

connecting one end of an analog data line to said subscriber's telephone equipment so as to receive analog voice signals;

connecting another end of said analog data line to conversion means for converting an analog voice signal on said analog data line to a digital voice signal;

configuring digital switching means tariffed for data services so as to provide signaling over said analog data line via said conversion means and so as to provide switched connections to an output of said digital switching means; and configuring a digital data line connected at one end to said output of said digital switching means so as to carry switched digital voice signals to/from an independent Central Office which is independent of an incumbent Local Exchange Carrier ("LEC") Central Office.

* * * * *

UNITED STATES PATENT AND TRADEMARK OFFICE
CERTIFICATE OF CORRECTION

PATENT NO. : 5,991,310
DATED : November 23, 1999
INVENTOR(S) : Mark G. Katko

It is certified that error appears in the above-identified patent and that said Letters Patent is hereby corrected as shown below:

Col. 1, line 46, "tc" should be --to--;

Col. 1, line 57, "ccst" should be --cost--;

Col. 6, line 57, "Ir" should be --In--;

Col. 7, line 51, "prcvide" should be --provide--;

Col. 10, line 19, "hiE" should be --his--;

Col. 13, line 26, "fur her" should be --further--'

Col. 16, line 43, "aid" should be --said--;

Col. 17, line 3, "dati" should be --data--;

Col. 18, line 19, "ore" should be --one--.

Signed and Sealed this

Twenty-second Day of August, 2000

Attest:

Q. TODD DICKINSON

Attesting Officer

Director of Patents and Trademarks